No. 810,652. PATENTED JAN. 23, 1906.
W. H. HOYT & W. J. GAVEN.
SIEVE.
APPLICATION FILED JAN. 6, 1905.
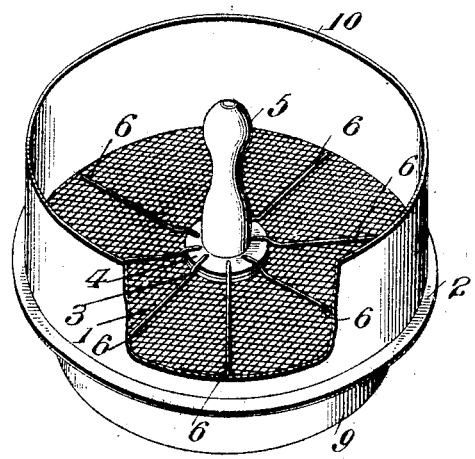
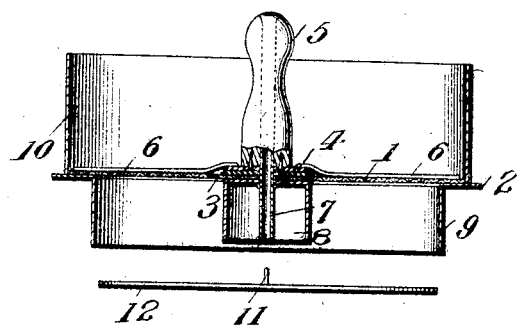
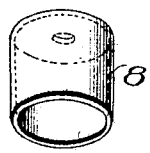

UNITED STATES PATENT OFFICE.

WILLIAM HELM HOYT AND WILLIAM JOSEPH GAVEN, OF BRIDGEPORT, CONNECTICUT, ASSIGNORS TO THE BURT COMPANY, OF HACKENSACK, NEW JERSEY, A CORPORATION OF NEW JERSEY.

SIEVE.

No. 810,652.   Specification of Letters Patent.   Patented Jan. 23, 1906.

Application filed January 6, 1905. Serial No. 239,936.

*To all whom it may concern:*

Be it known that we, WILLIAM HELM HOYT and WILLIAM JOSEPH GAVEN, of Bridgeport, Connecticut, have invented a new and useful Improvement in Sieves, which invention is fully set forth in the following specification.

The present invention relates to an improvement in sieves or sifters for accurately applying on any desired surface a continuous layer of uniform thickness of powder or other finely-divided material.

Though susceptible to other uses, the invention is particularly useful in the manufacture of duplicate sound-records of the "flat" or disk type wherein as the first step in the production of such duplicate records a continuous layer of "glaze" or shellac (which is to constitute the face of the duplicate sound-record) of practically uniform thickness is deposited on the face of the matrix from which the duplicate records are to be made, as set forth in our application, Serial No. 236,074, filed December 8, 1904.

The invention will be better understood by reference to the accompanying drawings, wherein—

Figure 1 is a perspective view of the improved sieve. Fig. 2 is a vertical sectional view thereof, and Fig. 3 is a detail.

Referring to the drawings, 1 is the usual mesh or wire-netting constituting the bottom of the sieve and secured in any suitable manner, as by soldering, to a ring or border 2 of sheet-steel or other material. A disk 3, of tin or other material, is secured to the center of the mesh 1 and forms a bearing whereon a similar disk 4 rests and rotates. To disk 4 is secured a handle 5, of any desired shape and material, and also a plurality of wires or fingers 6. The disk 4, handle 5, and wires 6, which together constitute the "clearing" means for effecting the deposit of the material, are firmly connected and rotate together.

Through the handle 5 extends a tube 7, the upper end of which is slightly upset to engage with the top of handle 5 and hold it in place. This tube 7 also extends through disks 3 and 4 and wire mesh 1 and passes through a perforation in the closed end of a can or cylinder 8, of tin or other suitable material, and to which it is firmly secured in any suitable manner. This cylinder 8 is secured to the wire mesh 1 beneath the disk 3 and is in size equal to that of the ordinary label which is affixed to the center of duplicate sound-records of the flat or disk type. Beneath the wire mesh 1 is secured to the ring 2 by soldering or otherwise a continuous circular strip 9 of any suitable material of a diameter equal to that of the matrix, so as to confine the deposit of material to the surface of the matrix, and another continuous circular piece of material 10 is secured to the upper side of the wire mesh in any suitable manner and constitutes the hopper for the retention of the material. The tube 7 besides holding the handle 5 in position is adapted to engage at its lower end a pin 11 on the center of the matrix 12 to exactly center the sieve thereabove.

As will be understood from the foregoing, when it is desired to effect a deposit of material on the desired surface—a matrix, for example—the material to be deposited is placed in the sieve, the tube 7 is caused to engage the pin 11 at the center of the matrix 12, and the sieve is lowered, thus closely confining the matrix by the strip 9, the label portion of the matrix being shielded by the can or cylinder 8. A turn is then given to the handle, which, causing the wires or fingers to move through the material in the sieve, effects the deposit on the matrix of a continuous layer or stratum of uniform thickness.

What is claimed is—

1. In a sieve, the combination of a clearing device, means for confining the deposit of material to the desired surface, means for centering the sieve over said surface, and means for protecting a portion of said surface from the deposit of material thereon.

2. In a sieve, the combination of a clearing device, means for confining the deposit of material to the desired surface, means for centering the sieve over said surface, and means resting on said surface and protecting a portion thereof from the deposit of material thereon.

3. In a sieve, the combination of the wire mesh, a clearing device, means for confining the deposit of material to the desired surface, means for centering the sieve over said surface, and a cylinder secured to the center of the under side of the wire mesh to protect a portion of said surface from the deposit of material thereon.

4. In a sieve, the combination of the wire mesh, a clearing device, means for centering the sieve over the surface on which material is to be deposited, and a cylinder secured to the center of the under side of the wire mesh to protect a portion of said surface from the deposit of material thereon.

5. In a sieve, the combination of the wire mesh, a clearing device, a cylinder secured to the center of the under side of the wire mesh to protect a portion of the surface on which the material is to be deposited, and means arranged within said cylinder for centering the sieve over said surface.

6. In a sieve, the combination of the wire mesh, a clearing device, a cylinder secured to the center of the under side of the wire mesh to protect a portion of the surface on which the material is to be deposited, and a guide in the center of the cylinder for centering the sieve over the desired surface.

7. In a sieve, a foraminous material constituting the sieve proper, and means carried thereby and confining to an annular space the material deposited by said sieve.

In testimony whereof we have signed this specification in the presence of two subscribing witnesses.

WILLIAM HELM HOYT.
WILLIAM JOSEPH GAVEN.

Witnesses:
W. J. GUGGENHEIM,
GEORGE SWEENEY, Jr.